(12) United States Patent
Burger et al.

(10) Patent No.: US 9,915,212 B2
(45) Date of Patent: Mar. 13, 2018

(54) ENGINE SYSTEM HAVING UNKNOWN-FUEL STARTUP STRATEGY

(71) Applicant: Caterpillar Inc., Peoria, IL (US)

(72) Inventors: Lucas Allen Burger, Lafayette, IN (US); Robert Jay Maxson, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 27 days.

(21) Appl. No.: 15/066,921

(22) Filed: Mar. 10, 2016

(65) Prior Publication Data

US 2017/0260917 A1    Sep. 14, 2017

(51) Int. Cl.
| | |
|---|---|
| *F02D 41/06* | (2006.01) |
| *F02D 19/08* | (2006.01) |
| *F02D 41/00* | (2006.01) |
| *F02B 43/10* | (2006.01) |
| *F02N 11/08* | (2006.01) |
| *F02D 35/02* | (2006.01) |

(52) U.S. Cl.
CPC .......... *F02D 41/0027* (2013.01); *F02B 43/10* (2013.01); *F02D 19/081* (2013.01); *F02D 35/023* (2013.01); *F02D 41/0082* (2013.01); *F02D 41/062* (2013.01); *F02D 41/065* (2013.01); *F02N 11/08* (2013.01); *F02D 2200/021* (2013.01); *F02D 2200/0611* (2013.01); *F02D 2200/101* (2013.01)

(58) Field of Classification Search
CPC .............. F02D 41/0027; F02D 41/062; F02D 41/0025; F02D 41/064; F02D 41/008; F02D 41/0082; F02D 41/065; F02D 35/023; F02D 35/027; F02D 19/0684; F02D 19/081; F02D 19/0626; F02D 19/0607; F02D 19/0613; F02D 19/0694; F02D 2200/101; F02D 2200/021; F02D 2200/0611; F02D 2041/0092; F02N 11/08; F02B 43/10; F02B 2043/103; F02B 2043/106

See application file for complete search history.

(56) References Cited

U.S. PATENT DOCUMENTS

| | | | |
|---|---|---|---|
| 4,962,741 A | 10/1990 | Cook et al. | |
| 5,413,075 A * | 5/1995 | Mamiya | F02B 43/00 123/431 |
| 5,535,135 A | 7/1996 | Bush et al. | |

(Continued)

FOREIGN PATENT DOCUMENTS

JP        2014218994        11/2014

*Primary Examiner* — Lindsay Low
*Assistant Examiner* — George Jin

(57) ABSTRACT

A control system is provided for use with an engine. The control system may have a plurality of fuel valves, at least one sensor, a starter motor, and a controller in communication with the plurality of fuel valves, the at least one sensor, and the starter motor. The controller may be configured to set at least a first of the plurality of fuel valves to a first admission setting, to set at least a second of the plurality of fuel valves to a second admission setting different from the first admission setting, and to cause the starter motor to crank the engine. The controller may also be configured to determine, based on the signal, which one of the first and second admission settings results in combustion initiation during cranking, and to responsively set all of the plurality of fuel valves to the one of the first and second admission settings.

18 Claims, 2 Drawing Sheets

(56) References Cited

U.S. PATENT DOCUMENTS

| | | | |
|---|---|---|---|
| 6,067,965 A | 5/2000 | Trumpy et al. | |
| 7,137,382 B2 | 11/2006 | Zhu et al. | |
| 7,942,128 B2 | 5/2011 | Leone et al. | |
| 8,402,028 B2 | 3/2013 | Leone et al. | |
| 2008/0289405 A1* | 11/2008 | Schenck Zu Schweinsberg | F02D 35/023 73/114.52 |
| 2009/0025695 A1* | 1/2009 | Wolber | F02D 41/0025 123/527 |
| 2009/0281710 A1* | 11/2009 | Mallebrein | F02D 41/1458 701/104 |
| 2010/0332104 A1* | 12/2010 | Griese | F02D 19/0631 701/102 |
| 2013/0073190 A1* | 3/2013 | Neisen | F02D 41/062 701/113 |
| 2014/0358407 A1* | 12/2014 | Pursifull | F02D 41/062 701/113 |
| 2015/0090222 A1 | 4/2015 | Rebinsky | |
| 2015/0176513 A1 | 6/2015 | Lana et al. | |

\* cited by examiner

ENGINE SYSTEM HAVING UNKNOWN-FUEL STARTUP STRATEGY

TECHNICAL FIELD

The present disclosure relates generally to an engine system and, more particularly, to an engine system having a startup strategy for use with a gaseous fuel of unknown composition.

BACKGROUND

Gaseous fuel powered engines can operate using a range of different fuels and fuel mixtures. These fuels and/or mixtures each have corresponding properties heating values, specific gravities, methane numbers, etc.) that can vary greatly. If unaccounted for, an engine operating in a satisfactory manner using a first fuel, may not operate as desired (e.g., the engine may not meet emissions and/or power requirements) or at all when fed a second fuel. For example, the engine may not start when supplied with the second fuel using settings previously successful with the first fuel.

Conventionally, a fuel of unknown consist or quality is accommodated by way of testing. In particular, samples of the fuel are taken and lab-tested to determine the corresponding properties. These properties are then manually input to a controller of the engine, such that the controller can adjust engine settings based on the properties. In some situations, the engine settings are manually adjusted based on the lab-testing. While this approach may be somewhat successful, it may also be resource expensive and unable to keep up with unexpected fuel changes.

One attempt to address the above-described problems is disclosed in U.S. Patent Publication No. 2015/0090222 of Rebinsky that published on Apr. 2, 2015 ("the '222 publication"). Specifically, the '222 publication discloses an engine system equipped with a fuel quality sensor. The fuel quality sensor has a sensing element configured to sense at least one of a heat capacity and a thermal conductivity of an unknown mixture of gaseous fuel, and a heating element configured to increase a temperature of the unknown mixture to multiple different temperature levels during sensing. The fuel quality sensor also includes a microprocessor configured to calculate at least one of a lower heating value, a Wobbe index, a % diluents, a specific gravity, a specific heat ratio, and a methane number of the unknown mixture as a function of the heat capacity and/or the thermal conductivity sensed at the multiple different temperature levels. The engine system also includes a controller configured to selectively adjust at least one of an air/fuel ratio, a timing, or a load on the engine based on the lower heating value, the Wobbe index, the % diluents, the specific gravity, the specific heat ratio, and/or the methane number.

Although the method described in the '222 publication may be adequate in some applications, it may still be less than optimal. For example, the method relies on input from a fuel quality sensor that may only be operational during operation of the engine. Accordingly, the method may not be applicable to startup of the engine. In addition, because the sensor relies on heating of the gas to multiple different temperatures, the sensor may be slow. Further, use of the sensor may increase a cost and complexity of the engine system.

The disclosed engine system is directed to overcoming one or more of the problems set forth above.

SUMMARY

In one aspect, the present disclosure is related to a control system for use with an engine having a plurality of cylinders. The control system may include a plurality of fuel valves, each configured to selectively admit a gaseous fuel into a corresponding one of the plurality of cylinders. The control system may also include at least one sensor associated with the plurality of cylinders and configured to generate a signal indicative of desired combustion initiation inside the plurality of cylinders. The control system may further include a starter motor, and a controller in communication with the plurality of fuel valves, the at least one sensor, and the starter motor. The controller may be configured to set at least a first of the plurality of fuel valves to a first admission setting, to set at least a second of the plurality of fuel valves to a second admission setting different from the first admission setting, and to cause the starter motor to initiate cranking of the engine. The controller may also be configured to determine, based on the signal, which one of the first and second admission settings results in desired combustion initiation during engine cranking, and to responsively set all of the plurality of fuel valves to the one of the first and second admission settings.

In another aspect, the present disclosure is directed to an engine. The engine may include an engine block at least partially defining a plurality of cylinders, a crankshaft rotatably supported in the engine block, and a plurality of pistons driven by the crankshaft to reciprocate inside the plurality of cylinders. The engine may also include a plurality of fuel valves each configured to selectively admit a gaseous fuel into a corresponding one of the plurality of cylinders, and a plurality of in-cylinder sensors. The plurality of in-cylinder sensors may each be associated with a corresponding one of the plurality of cylinders and configured to generate a signal indicative of desired combustion initiation inside the corresponding one of the plurality of cylinders. The engine may further include a starter motor operatively connected to the crankshaft, and a controller in communication with the plurality of fuel valves, the plurality of sensors, and the starter motor. The controller may be configured to divide the plurality of cylinders into at least a first, second, and third subset each having a plurality of cylinders. The controller may also be configured to set the plurality of fuel valves corresponding to the plurality of cylinders in the first subset to a first admission setting, to set the plurality of fuel valves corresponding to the plurality of cylinders in the second subset to a second admission setting higher than the first admission setting, and to set the plurality of fuel valves corresponding to the plurality of cylinders in the third subset to a third admission setting lower than the first admission setting. The controller may further be configured to cause the starter motor to initiate cranking of the engine, to determine, based on the signal, which one of the first, second, and third admission settings results in desired combustion initiation during engine cranking, and to responsively set all of the plurality of fuel valves to the one of the first, second, and third admission settings.

In yet another aspect, the present disclosure is directed to a method of controlling an engine having a plurality of cylinders. The method may include admitting gaseous fuel into at least a first of the plurality of cylinders at a first rate, and admitting gaseous fuel into at least a second of the plurality of cylinders at a second rate different from the first rate. The method may also include cranking the engine, sensing which one of the first and second rates results in desired combustion initiation, and responsively admitting gaseous fuel into all of the plurality of cylinders at the one of the first and second rates.

DETAILED DESCRIPTION

Figure 1:
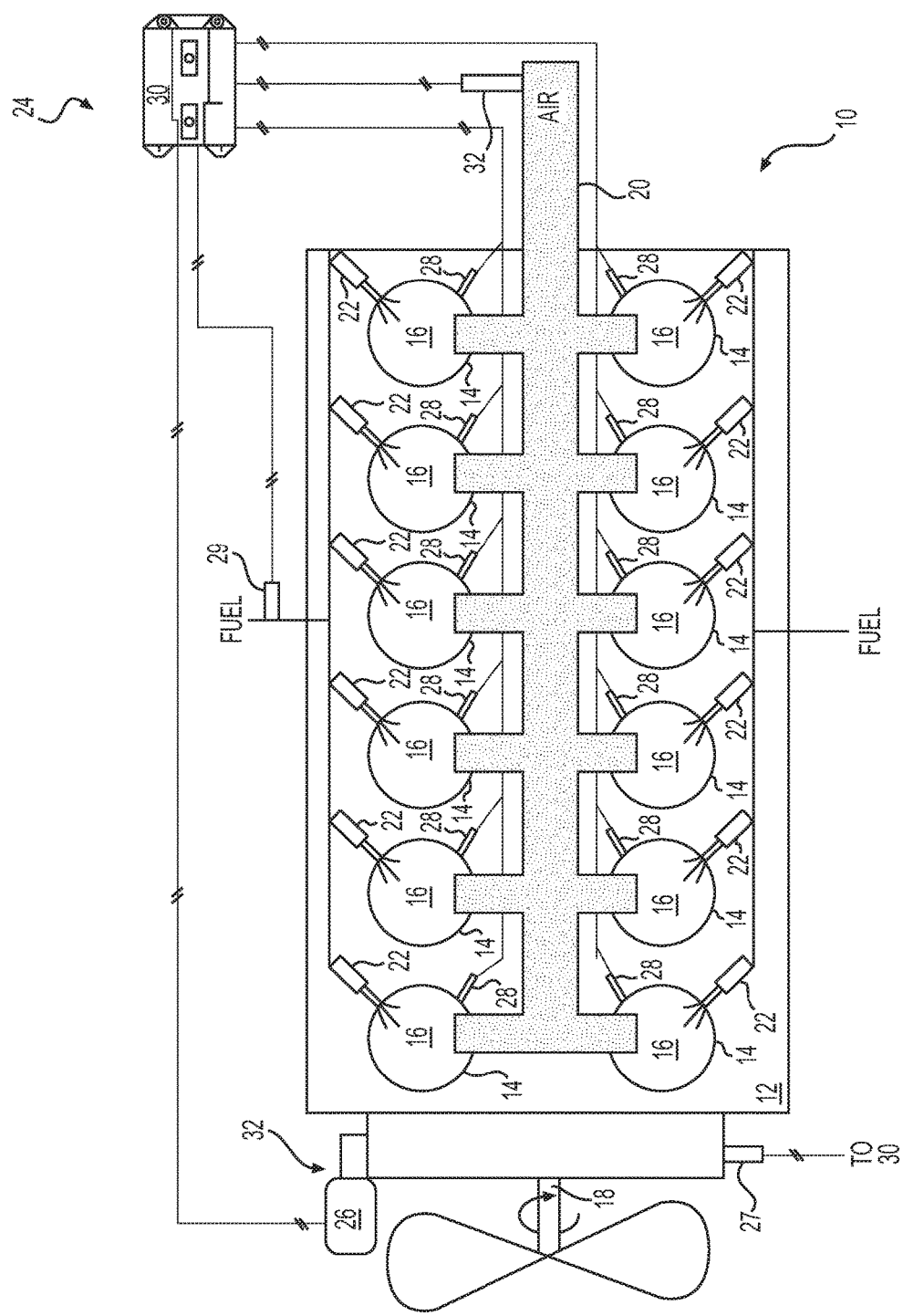
FIG. 1 is a diagrammatic illustration of an exemplary disclosed engine and control system.

FIG. 1 illustrates an exemplary internal combustion engine 10. For the purposes of this disclosure, engine 10 is shown and described as a four-stroke, gaseous fuel-powered engine. It is contemplated, however, that engine 10 could alternatively be a two-stroke, gaseous fuel-powered engine, if desired. Engine 10 may include, among other things, an engine block 12 defining a plurality of cylinders 14. A cylinder head (not shown) may be connected to engine block 12 to close off an end of each cylinder 14, and a piston may be slidably disposed within each cylinder 14. Cylinder 14, together with the cylinder head and the piston may define a combustion chamber 16. It is contemplated that engine 10 may include any number of combustion chambers 16, and that combustion chambers 16 may be disposed in an "in-line" configuration, in a "V" configuration, in an opposing-piston configuration, or in any other suitable configuration.

Each piston may be configured to reciprocate within a corresponding cylinder 14 between a top-dead-center (TDC) position and a bottom-dead-center (BDC) position. In particular, each piston may be pivotally connected to a crankshaft 18, which is rotatably disposed within engine block 12, so that a sliding motion of each piston within cylinder 14 results in a corresponding rotation of crankshaft 18. Similarly, a rotation of crankshaft 18 may result in a sliding motion of the pistons. As crankshaft 18 rotates through about 720°, each piston may move through four full strokes. Engine 10, as a four-stroke engine, may undergo a complete combustion cycle within this time that includes an intake stroke, a compression stroke, a power stroke, and an exhaust stroke.

During the intake stroke, air may be drawn and/or forced from an intake manifold 20 into combustion chambers 16 via one or more intake ports (not shown) located within an annular surface of each cylinder 14. In particular, as each piston moves downward within its corresponding cylinder 14, a position will eventually be reached at which the intake ports are no longer blocked by the piston and instead are fluidly communicated with combustion chamber 16. When the intake ports are in fluid communication with combustion chamber 16 and a pressure of air at the intake ports is greater than a pressure within combustion chamber 16, air will pass through the intake ports into combustion chamber 16.

Gaseous fuel (e.g., natural gas, landfill gas, bio gas, propane, etc.) may be mixed with the air before, during, and/or after the air enters combustion chamber 16 in a direct injection or port injection manner. In the disclosed embodiment, a single radially-oriented admission valve 22 is shown as being associated with one of the intake ports (i.e., to inject gaseous fuel through the corresponding port). It is contemplated, however, that any number of admission valves 22 may be utilized, and that admission valves 22 may be disposed within the air intake ports or located elsewhere within (e.g., within an air passage of) engine 10, as desired. The gaseous fuel from admission valves 22 may mix with the air from the intake ports to form a fuel/air mixture within combustion chamber 16.

During the beginning of the compression stroke described above, air may still be entering combustion chamber 16 via the intake ports as the associated piston starts its upward stroke to mix any residual gas with air and fuel in combustion chamber 16. Eventually, the intake ports may be blocked by the piston, and further upward motion of the piston may compress the mixture. As the mixture within combustion chamber 16 is compressed, the mixture will increase in pressure and temperature. At a point near the end of the upward piston stroke, combustion of the air/fuel mixture inside cylinders 14 may be initiated, resulting in a sudden release of chemical energy. The combustion may be initiated in may be different ways, for example by way the compressing action of the piston alone, by way of a spark plug, by way of injection of a high-pressure fluid or gas, or in another manner known in the art. The subsequent chemical energy release may result in a further and significant increase in the pressure and temperature within cylinders 14.

After the piston reaches TDC, the increased pressure caused by combustion may force the piston downward, thereby imparting mechanical power to crankshaft 18. During a return of the piston (i.e., during the ensuing upward movement of the exhaust stroke), one or more exhaust valves (not shown) may open to allow pressurized exhaust to be pushed out of combustion chamber 16.

In order for the combustion cycle described above to be successful, the ratio of air to fuel inside combustion chamber 16 must be within a range that supports flame propagation. In the disclosed embodiment, this range may be about 17-22:1. If the amount of air-to-fuel is lower or higher than this ratio, it may not be possible to start engine 10 and/or to keep engine 10 running. Unfortunately, due to varying applications of engine 10 and/or to varying qualities and/or densities of the fuel supplied to engine 10, it may be possible for the air-to-fuel ratio to inadvertently change, even though settings of engine 10 (e.g., fuel admission settings of valves 22) have not changed. For this reason, engine 10 may additionally be equipped with a control system 24 configured to control starting of engine 10 under varying fuel supply conditions.

Control system 24 may include multiple components that cooperate to improve starting success of engine 10, even when a composition of the fuel supplied to engine 10 varies. These components may include, among other things, a starter motor 26, an engine speed sensor 27, one or more combustion sensors 28, a fuel sensor 29, and a controller 30. For the purposes of this disclosure, admission valves 22 may also be considered to form a portion of control system 24. As will be explained in more detail below, based on feedback from sensors 27-29, controller 30 may selectively activate starter motor 26 to crank engine 10 while adjusting operation of admission valves 22 until combustion initiation is confirmed.

Starter motor 26 may be electrically powered, pneumatically powered, hydraulically powered, or powered in another manner known in the art to initiate rotation of engine 10 during a startup sequence, before combustion inside cylinders 14 has been initiated and/or is self-sustaining. In the disclosed embodiment, starter motor 26 is mechanically connected to crankshaft 18 by way of a gear train 32. Starter motor 26 may be supplied with power (e.g., electrically powered from an onboard battery—not shown), and regulated (e.g., turned on and off) by controller 30.

Engine speed sensor 27 may be associated with a rotating component of engine 10, and configured to generate a signal indicative of an actual speed and direction thereof. For example, sensor 27 may be associated with a crankshaft, with a flywheel, with a camshaft, with a gear, or with another rotating component. Sensor 27 may include a permanent magnet imbedded in any of these rotating components, and a stationary sensing element (e.g., a hall-effect element) spaced near the component and configured to detect a rotating field produced by the magnet, an optical signal, an indexing mark or tooth, or other similar element. Signals generated by the sensing element of sensor 27 may be directed to controller 30 for further processing.

Any type of combustion sensor 28 known in the art may be used in conjunction with system 24. For example, combustion sensor 28 may embody an ionization probe, an in-cylinder pressure sensor, a high-speed thermocouple, a NOx sensor, or another type of sensor disposed in communication with combustion chamber 16. Combustion sensor 28 may be mounted in a cylinder head of engine 10, in an exhaust passage connected to the cylinder head, or in another similar location. It is contemplated that one combustion sensor 28 may be paired with each (i.e., dedicated for use with a single) cylinder 14, or that one combustion sensor 28 may be used with subsets (i.e., used in common with multiple, but not all) of cylinders 14, as desired. For example, a single combustion sensor 28 could be disposed within a branch of a divided exhaust manifold that is fed with exhaust from two or more (but not all) of cylinders 14. Other configurations may also be possible. Regardless of the specific configuration that is implemented, combustion sensor 28 may be configured to generate a signal indicative of combustion being initiated inside a corresponding one or more of cylinders 14. The signals generated by sensor(s) 28 may be directed to controller 30 for further processing. It is contemplated that, in some embodiments, in addition to or in place of the signals generated by sensor(s) 28, the signals generated by engine speed sensor 27 may be used as an indication of combustion initiation inside of engine 10. For example, an engine speed increase greater than a starting speed may be indicative of combustion initiation.

Fuel sensor 29 may embody any type of sensor known in the art that is configured to generate signals indicative of fuel flow parameters during startup of engine 10. These parameters could include, among other things, a fuel flow rate, a fuel pressure, and/or a fuel temperature. Signals generated by fuel sensor 29 may be directed to controller 30 for further processing.

Controller 30 may embody a single processor or multiple processors that include a means for controlling an operation of engine 10. Numerous commercially available processors may perform the functions of controller 30. Controller 30 may include or be associated with a memory for storing data such as, for example, an operating condition, design limits, performance characteristics or specifications of engine 10, operational instructions, and corresponding fuel composition parameters. Various other known circuits may be associated with controller 30, including power supply circuitry, signal-conditioning circuitry, solenoid driver circuitry, communication circuitry, and other appropriate circuitry. Moreover, controller 30 may be capable of communicating with other components of engine 10 (e.g., with starter motor 26, sensors 28, admission valves 22, etc.) via either wired or wireless transmission and, as such, controller 30 could connected directly to the components or alternatively disposed in a location remote from engine 10.

In some embodiments, controller 30 may rely on additional sensory information when regulating operation of admission valves 22 and/or starter motor 26 (i.e., in addition to the information being provided by sensors 28). This sensory information may include, among other things, a parameter (e.g., a speed density) of air passing through inlet manifold 20, a fuel flow, a fuel pressure, and a fuel temperature. The sensory information may be provided by way of one or more sensors 34, for example an inlet manifold pressure sensor, an inlet manifold temperature sensor, a mass air flow sensor, an engine speed sensor, a turbocharger (e.g., turbo speed, turbo pressure, turbo temperature, etc.) sensor, or another sensor known in the art.

Figure 2:
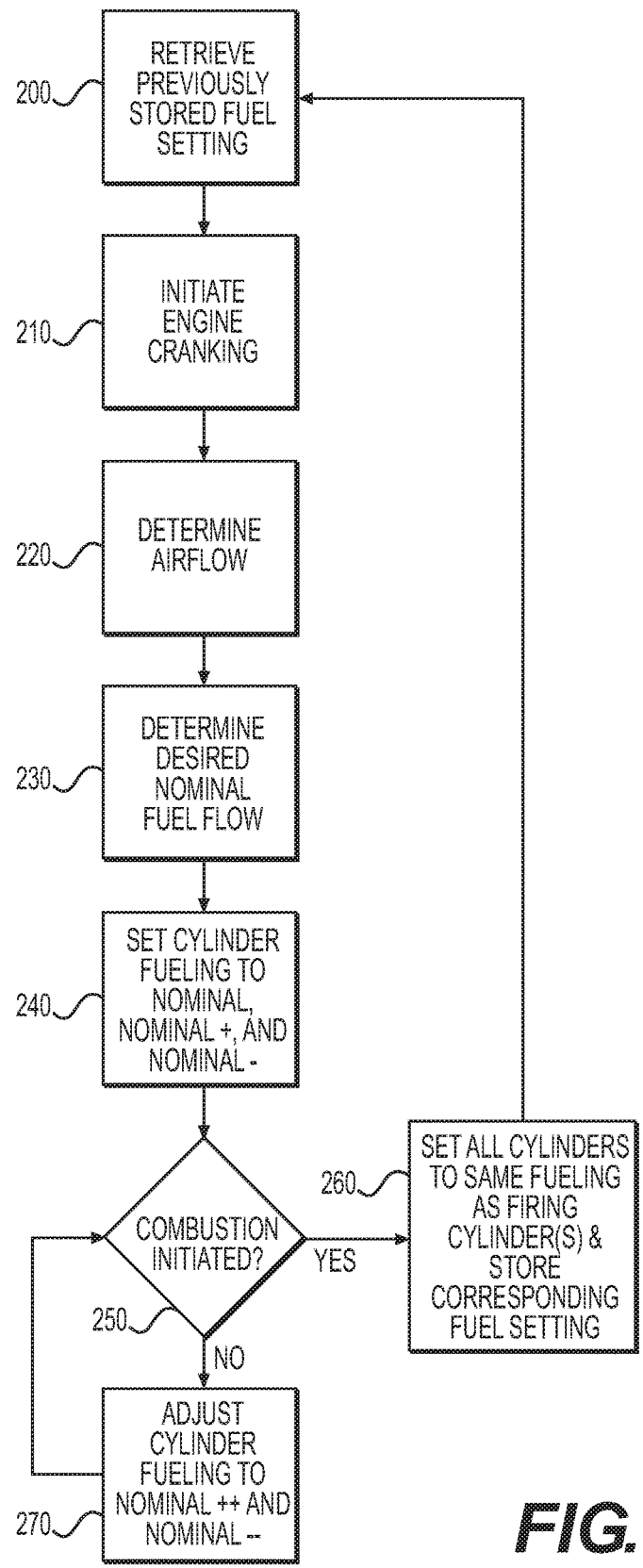
FIG. 2 is a flowchart depicting an exemplary disclosed method that may be performed by the control system of FIG. 1.

FIG. 2 illustrates an exemplary method performed by controller 30 during startup of engine 10. FIG. 2 will be discussed in more detail in the following section to further illustrate the disclosed concepts.

INDUSTRIAL APPLICABILITY

The disclosed control system may be applicable to situations of changing fuel supply, where reliable startup of an associated engine is desired. The disclosed control system may help ensure reliable startup by selectively implementing engine adjustments during a starting sequence based on changing fuel composition parameters and combustion detection. Operation of control system 24 will now be described in detail with respect to FIG. 2.

At a beginning of a starting event, controller 30 may retrieve from memory a previously stored fuel setting (Step 200). The fuel setting may be the setting of admission valves 22 used just prior to the last shutdown of engine 10 and/or in a previous startup event. The fuel setting may correspond with an air-to-fuel ratio required for combustion initiation and a composition (e.g., a lower heating value, a specific gravity, and/or a methane number) of fuel last combusted inside engine 10. Controller 30 may use these settings with the assumption that the fuel composition is the same or has not deviated significantly from the time of the last shutdown or startup event.

Controller 30 may then initiate cranking of engine 10 (Step 210). As described above, cranking may be, performed by starter motor 26, and selectively initiated by directing power (e.g., electrical power from the onboard battery) to starter motor 26. In some embodiments, activation of starter motor 26 may be controlled based on feedback from engine speed sensor 27. During cranking of engine 10, controller 30 may determine a parameter (e.g., a speed density and/or flow rate) of the air being delivered to cylinders 14 (Step 215). The air parameter may be provided by way of sensor 34, assumed by controller 30 based on typical air parameter experienced during cranking, and/or calculated based on other assumed, known, or measured parameters (e.g., engine speed, turbocharger speed, inlet manifold air density, ambient temperature and pressure, volumetric efficiency, etc.).

Based on the actual or estimated air parameter (e.g., the speed density and/or flow rate) and the previously stored admission valve settings, controller 30 may determine a desired nominal fuel flow that should provide an air-to-fuel ratio adequate to support combustion (Step 230). In particular, controller 30 may determine, based on the previously stored fuel setting, an assumed composition of the fuel currently being supplied to engine 10, and a corresponding amount of that same-composition fuel that should be provided given the current air parameter to achieve the air-to-fuel ratio required for starting engine 10. For example, the nominal fuel flow may be determined by dividing the air flow of engine 10 by a desired air/fuel ratio required for starting. It is contemplated that the nominal fuel flow value may be determined based further on the signals generated by sensor 27, if desired.

Controller 30 may then adjust the settings of admission valves 22, such that at least one cylinder 14 is being provided with the nominal fuel flow, at least one cylinder 14 is being provided with a higher fuel flow, and at least one cylinder 14 is being provided with a lower fuel flow (Step 240). In one example, a first difference between the higher and nominal fuel flows is about equal to a second difference between the lower and nominal fuel flows. For instance, both the first and second differences may be about 10% of the nominal fuel flow. It is contemplated, however, that the first and second differences may be dissimilar, and more or less than 10% of the nominal fuel flow, if desired.

In the disclosed embodiment, controller 30 may be configured to divide cylinders 14 of engine 10 into subsets of cylinders 14, and apply the nominal, higher, and lower fuel flows separately to the subsets of cylinders 14. For example, controller 30 may divide cylinders 14 into three subsets of four cylinders 14 each, with the admission valves of the first subset receiving the nominal fuel flow setting, the second subset receiving the higher fuel flow setting, and the third subset receiving the lower fuel flow setting. By adjusting fuel settings of subsets of cylinders 14 (i.e., rather than individual cylinders 14), variability between and/or malfunction of individual cylinders 14 have little effect on the startup of engine 10.

After causing the appropriate admission valve(s) 22 to be adjusted to the nominal, higher, and lower fuel flow settings, controller 30 may determine which of these settings results in combustion initiation during engine cranking by starter motor 26 (Step 250). Controller 30 may make this determination based on signals generated by combustion sensors 28 and/or engine speed sensor 27. For example, when controller 30 determines that ions are being formed inside combustion chamber 16, that a pressure and/or temperature has spiked, and/or that a speed of engine 10 is greater than a cranking speed imparted to engine 10 by starter motor 26, controller 30 may conclude that combustion within the corresponding cylinder 14 or subset of cylinders has been initiated. When controller 30 determines that combustion has been initiated inside a particular cylinder 14 or a particular subset of cylinders 14, controller 30 may then cause all admission valves 22 of engine 10 to be adjusted to the same fuel flow setting as the firing cylinder(s) 14, and also store the corresponding fuel flow setting for future use in a next startup event (Step 260).

However, when controller 30 determines at step 250 that combustion has not been initiated inside any of cylinders 14, controller 40 may instead make adjustments to the fuel flow settings of admission valves 22 (Step 270). In particular, controller 40 may increase fueling of one or more of cylinders 14, and also decrease fueling of one or more other cylinders 14. In some applications, the amount of increase and the amount of decrease in the fuel flow settings of admission valves 22 made at this time may be about the same.

In the disclosed embodiment, during completion of step 270, controller is configured to re-divide cylinders 14 into different subset groupings. For example, instead of the three subsets described above, controller 30 may instead create only two subsets, each having an equal number (e.g., six) of cylinders 14. Controller 30 may then adjust the fuel flow settings of admission valves 22 associated with one of these subsets to be lower than a lowest fuel flow setting used so far in the current startup sequence, and adjust the fuel flow settings of admission valves 22 associated with the other of these subsets to be higher than a highest fuel flow setting used so far. For example, the first of these subsets may have a fuel flow setting that is about 20% lower than the nominal setting, while the second of these subsets may have a fuel flow setting that is about 20% higher than the nominal setting. It is contemplated that controller 30 could divide cylinders 14 into a different number of subsets, that the fuel flow adjustments could be unequal, and/or that the adjustment amounts may be more or less than 20% of the nominal value, if desired. Control may then cycle back to step 250 following completion of step 270, and may continue to do so until a time set aside for engine cranking has been exhausted, until power sufficient to drive starter motor 26 falls below a set threshold, or until fueling limits are reached in the adjustments of admission valves 22.

The disclosed control system may provide several benefits. First, the disclosed control system may not need to rely on input from a fuel quality sensor, making the system useful during starting before engine 10 is fully operational. In addition, the system may be highly responsive, inexpensive, and simple.

It will be apparent to those skilled in the art that various modifications and variations can be made to the control system of the present disclosure. Other embodiments of the control system will be apparent to those skilled in the art from consideration of the specification and practice disclosed herein. For example, it may be possible for two different fuel settings to simultaneously support combustion. In this situation, the disclosed system may be capable of determining (e.g., based on sensory input) which of the settings promotes better or a desired combustion (i.e., combustion without knocking or higher efficiency combustion) and to apply that setting to all fuel admission valves. It is intended that the specification and examples be considered as exemplary only, with a true scope of the disclosure being indicated by the following claims and their equivalents.

What is claimed is:

1. A control system for use with an engine having a plurality of cylinders, comprising:
   a plurality of fuel valves, each configured to selectively admit a gaseous fuel into a corresponding one of the plurality of cylinders;
   at least one sensor associated with the plurality of cylinders and configured to generate a signal indicative of combustion initiation inside the plurality of cylinders;
   a starter motor; and
   a controller in communication with the plurality of fuel valves, the at least one sensor, and the starter motor, the controller being configured to:
      set at least a first of the plurality of fuel valves to a first admission setting;
      set at least a second of the plurality of fuel valves to a second admission setting different from the first admission setting;
      set at least a third of the plurality of fuel valves to a third admission setting different from the first and second admission settings;
      cause the starter motor to initiate cranking of the engine;
      determine, based on the signal, which one of the first, second, and third admission settings results in desired combustion initiation during engine cranking; and
      responsively set all of the plurality of fuel valves to the one of the first, second, and third admission settings.

2. The control system of claim 1, wherein:
   the first admission setting is a nominal admission setting;
   the second admission setting is an admission setting higher than the nominal admission setting; and
   the third admission setting is an admission setting lower than the nominal admission setting.

3. The control system of claim 2, wherein a difference between the first and second admission settings is about equal to a difference between the second and third admission settings.

4. The control system of claim 1, wherein:
the controller is further configured to divide the plurality of cylinders into at least a first, second, and third subset each having a plurality of cylinders;
the at least a first of the plurality of fuel valves includes a first plurality of fuel valves associated with the first subset;
the at least a second of the plurality of fuel valves includes a second plurality of fuel valves associated with the second subset; and
the at least a third of the plurality of fuel valves includes a third plurality of fuel valves associated with the third subset.

5. The control system of claim 4, wherein a number of the plurality of cylinders in each of the first, second, and third subsets is the same.

6. The control system of claim 5, wherein, when desired combustion initiation does not take place in any of the first, second, or third subsets, the controller is further configured to:
re-divide the plurality of cylinders into only a fourth subset and a fifth subset;
set a fourth of the plurality of the of the plurality of fuel valves corresponding to the fourth subset to a fourth admission setting greater than any of the first, second, and third admission settings;
set a fifth plurality of the plurality of fuel valves corresponding to the fifth subset to a fifth admission setting lower than any of the first, second, and third admission settings;
cause the starter motor to initiate cranking of the engine;
determine, based on the signal, which one of the fourth and fifth admission settings results in desired combustion initiation; and
responsively set all of the plurality of fuel valves to the one of the fourth and fifth admission settings.

7. The control system of claim 6, wherein:
a difference between the first and fourth admission settings is about equal to twice a difference between the first and second admission settings; and
a difference between the first and fifth admission settings is about equal to twice a difference between the first and third admission settings.

8. The control system of claim 4, wherein the at least one sensor includes one sensor for each of the first, second, and third subsets.

9. The control system of claim 1, wherein the at least one sensor includes one sensor for each of the plurality of cylinders.

10. The control system of claim 1, wherein the at least one sensor is one of an ionization probe, an in-cylinder pressure sensor, a thermocouple, or an engine speed sensor.

11. The control system of claim 1, wherein:
the at least one sensor is a first sensor;
the signal is a first signal;
the control system further includes a second sensor configured to generate a second signal indicative of air flow into the plurality of cylinders; and
the controller is configured to determine the first and second admission settings based on the second signal.

12. The control system of claim 11, wherein the controller is further configured to:
store in memory the one of the first and second admission settings from a current cycle; and
determine the first and second admission settings for a next cycle based on the stored one of the first and second admission settings from the current cycle.

13. An engine, comprising:
an engine block at least partially defining a plurality of cylinders;
a crankshaft rotatably supported in the engine block;
a plurality of pistons driven by the crankshaft to reciprocate inside the plurality of cylinders;
a plurality of fuel valves each configured to selectively admit a gaseous fuel into a corresponding one of the plurality of cylinders;
a plurality of in-cylinder sensors, each associated with a corresponding one of the plurality of cylinders and configured to generate a signal indicative of desired combustion initiation inside the corresponding one of the plurality of cylinders;
a starter motor operatively connected to the crankshaft; and
a controller in communication with the plurality of fuel valves, the plurality of sensors, and the starter motor, the controller being configured to:
divide the plurality of cylinders into at least a first, second, and third subset each having a plurality of cylinders;
set the plurality of fuel valves corresponding to the plurality of cylinders in the first subset to a first admission setting;
set the plurality of fuel valves corresponding to the plurality of cylinders in the second subset to a second admission setting higher than the first admission setting;
set the plurality of fuel valves corresponding to the plurality of cylinders in the third subset to a third admission setting lower than the first admission setting
cause the starter motor to initiate cranking of the engine;
determine, based on the signal, which one of the first, second, and third admission settings results in desired combustion initiation during engine cranking; and
responsively set all of the plurality of fuel valves to the one of the first, second, and third admission settings.

14. The engine of claim 13, wherein when desired combustion initiation does not take place in any of the first, second, or third subsets, the controller is further configured to:
re-divide the plurality of cylinders into only a fourth subset and a fifth subset;
set the plurality of the fuel valves corresponding to the fourth subset to a fourth admission setting greater than any of the first, second, and third admission settings;
set the plurality of the fuel valves corresponding to the fifth subset to a fifth admission setting lower than any of the first, second, and third admission settings;
cause the starter motor to initiate cranking of the engine;
determine, based on the signal, which one of the fourth and fifth admission settings results in desired combustion initiation; and
responsively set all of the plurality of fuel valves to the one of the fourth and fifth admission settings.

15. The engine of claim 13, wherein each of the plurality of in-cylinder sensors is one of an ionization probe, an in-cylinder pressure sensor, a thermocouple, or an engine speed sensor.

16. The engine of claim 13, wherein:
the plurality of sensors is a first plurality of sensors;
the signal is a first signal;

the engine further includes at least a second sensor configured to generate a second signal indicative of air flow into the plurality of cylinders; and the controller is configured to determine the first, second, and third admission settings based on the second signal.

17. A method of controlling an engine having a plurality of cylinders, comprising:

admitting gaseous fuel into at least a first of the plurality of cylinders at a first rate;

admitting gaseous fuel into at least a second of the plurality of cylinders at a second rate different from the first rate;

admitting gaseous fuel into at least a third of the plurality of cylinders at a third rate different from the first and second rates;

cranking the engine;

sensing which one of the first, second, and third rates results in desired combustion initiation; and responsively admitting gaseous fuel into all of the plurality of cylinders at the one of the first, second, and third rates.

18. The method of claim 17, wherein when admitting gaseous fuel at the first and third rates does not result in desired combustion initiation during engine cranking, the method further includes:

admitting gaseous fuel into at least the first of the plurality of cylinders at a third rate greater than the first and second rates;

admitting gaseous fuel into at least the second of the plurality of cylinders at a fourth rate lower than the first and second rates;

cranking of the engine;

sensing which one of the third and fourth rates results in desired combustion initiation; and responsively admitting gaseous fuel into all of the plurality of cylinders at the one of the third and fourth rates.

* * * * *